(12) United States Patent
Bielfeldt

(10) Patent No.: US 6,444,079 B1
(45) Date of Patent: Sep. 3, 2002

(54) PROCESS AND APPARATUS FOR PRODUCING ENDLESS LAMINATED VENEER BOARDS

(75) Inventor: Friedrich B. Bielfeldt, Paehl (DE)

(73) Assignee: Maschinenfabrik J. Dieffenbacher GmbH & Co., Eppingen (DE)

( * ) Notice: Subject to any disclaimer, the term of this patent is extended or adjusted under 35 U.S.C. 154(b) by 0 days.

(21) Appl. No.: 09/369,847

(22) Filed: Aug. 9, 1999

(30) Foreign Application Priority Data

Aug. 8, 1998 (DE) .......................................... 198 35 946

(51) Int. Cl.$^7$ .......................... B32B 31/10; B32B 31/12
(52) U.S. Cl. ..................... 156/266; 156/264; 156/275.7; 156/304.1; 156/324
(58) Field of Search ................................ 156/264, 558, 156/559, 563, 580, 324, 275.7, 266, 304.1

(56) References Cited

U.S. PATENT DOCUMENTS

| | | | | |
|---|---|---|---|---|
| 3,963,552 A | * | 6/1976 | Troutner | 156/299 |
| 4,239,577 A | * | 12/1980 | Hartman et al. | 156/312 |
| 5,892,208 A | * | 4/1999 | Harris et al. | 156/272.2 |
| 5,895,546 A | | 4/1999 | Bielfeldt et al. | 156/304.1 |
| 5,942,079 A | | 8/1999 | Bielfeldt et al. | 156/379.8 |
| 6,004,648 A | * | 12/1999 | Snyder | 156/273.7 |
| 6,143,119 A | * | 11/2000 | Seidner | 156/257 |

FOREIGN PATENT DOCUMENTS

| | | |
|---|---|---|
| DE | B1 197 18 771 | 5/1997 |
| DE | 196 27 024 | 1/1998 |

* cited by examiner

*Primary Examiner*—Michael W. Ball
*Assistant Examiner*—Todd J. Kilkenny

(57) ABSTRACT

A process and an apparatus for producing endless laminated veneer boards from a veneer-panel strand comprising veneer panels laid together in a plurality of layers by means of gluing and compression in a heated, continuously operating press. The veneer-panel strand is run through a preliminary press with a preheating device before it enters the press. The layers of glue applied to the veneer panels and/or the veneer panels for the center or a central-layer strand have a higher moisture content than the layers of glue and/or the veneer panels for the outer layers or the cover-layer strands. The veneer panels are each then assembled to give an upper and a lower cover-layer strand and, if required, a central-layer strand, and are combined to give a veneer-panel strand. Before it enters the continuously operating press, the veneer-panel strand is passed through a preliminary press with a microwave or high-frequency preheating device, the heat input of which into the veneer-panel strand acts from the inside outwards.

16 Claims, 4 Drawing Sheets

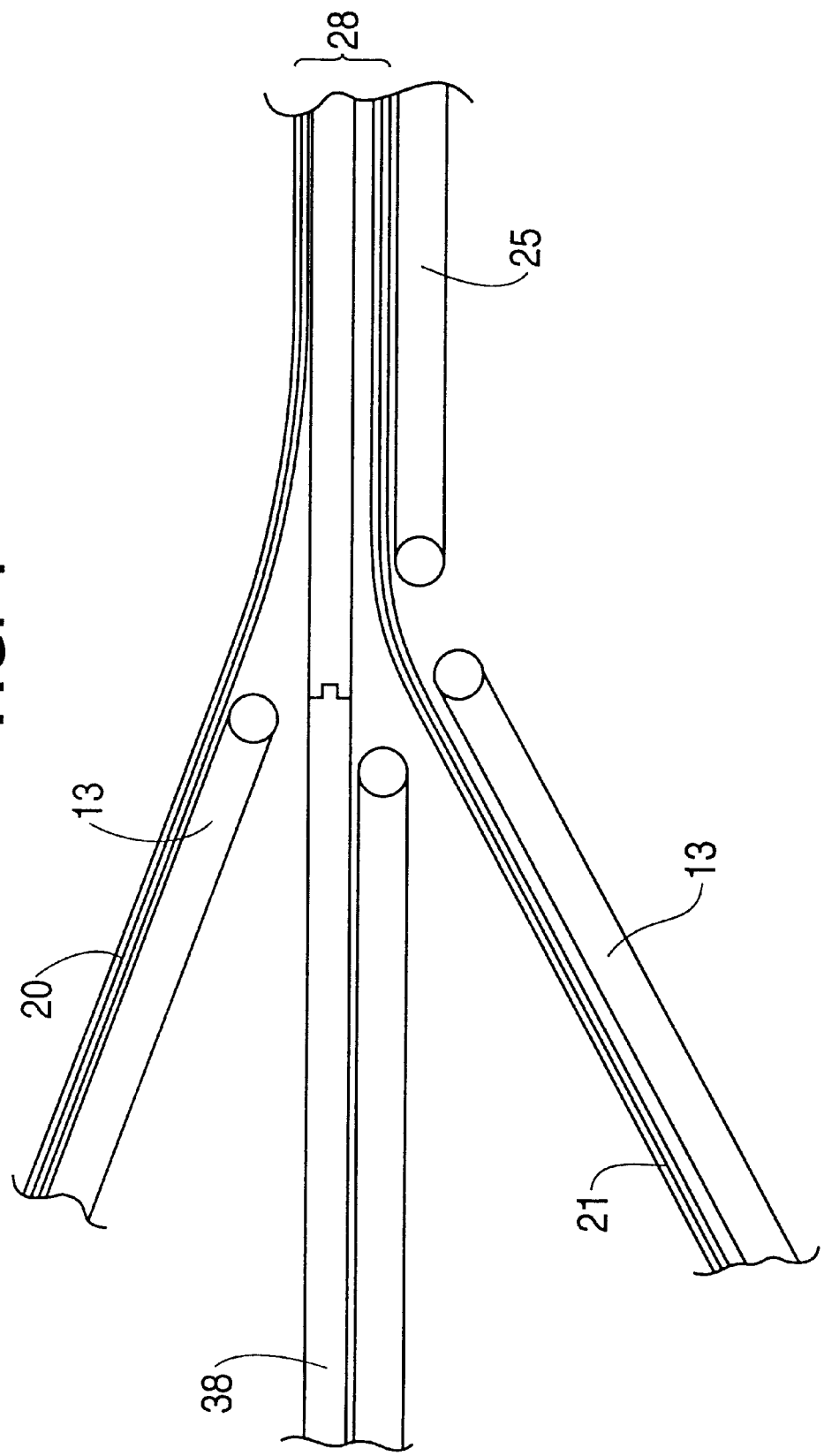

PROCESS AND APPARATUS FOR PRODUCING ENDLESS LAMINATED VENEER BOARDS

BACKGROUND OF THE INVENTION

1. Field of the Invention

The invention relates to a process and an apparatus for producing endless laminated veneer boards.

2. Description of the Related Art

A process for producing laminated veneer boards has been disclosed in DE-A 196 27 024. That process is based on the object of combining laminated assemblies of large-area veneer panels (or sheets) automatically and continuously with adequate mechanical connection so that, given the subsequent continuous pressing operation, the veneer-assembly transition points have virtually the same physical strength properties in the finished laminated veneer boards as the laminated veneer boards produced according to the previous laminated veneer assemblies of sandwich construction. Thus, it is possible to produce laminated veneer boards of good quality if all of the manufacturing or production parameters are matched to one another in an optimum manner and the apparatus operates accordingly. Problems arise, however, from the fact that the moisture content of the layers of glue on the surfaces of the veneer panels and the moisture content of the veneer panels themselves are either too low or too high. If the moisture content is too high, there is the risk that an air/vapor mixture will lead to the formation of vapor in capillaries, resulting in splits in the finished product. If the moisture content is too low, the resulting strength properties of the laminated veneer boards are inadequate. With regards to process engineering, heat transfer to the center, as in the production of particle board and fiber board, is not possible in the course of vapor generation during the production of plywood or LVL boards, because the veneer panels form a natural vapor barrier.

SUMMARY OF THE INVENTION

The object of the present invention is to specify a process and an apparatus by means of which higher quality and a higher throughput rate (through a faster sequence) can be achieved in the continuous production of laminated veneer boards.

According to a first embodiment of the process according to the invention, a method of producing endless laminated veneer boards comprises the steps of: applying an adhesive to at least some of a plurality of veneer panels; assembling the plurality of veneer panels in a plurality of interlinking layers to form one or more cover-layer strands, each of the cover-layer strands having central panels and outer panels; combining one or more of the plurality of cover-layer strands to form a veneer-panel strand, the veneer-panel strand having outer layers and central layers, wherein a moisture content of at least one of the adhesive and the veneer panels is greater at the central layers than at the outer layers; and preheating said veneer-panel strand from inside outwards.

Preferably, the central layers have a moisture content of about 7.8%, and the outer layers have a moisture content of about 6%.

The method may further comprise the step of pressing the veneer-panel strand in an operating press.

Further, during the step of assembling, direction of fibers in one of the plurality of layers of the veneer panels may be placed at a 90° offset to an adjacent layer.

A derived timber product board strip may be combined between two cover-layer strands. The derived timber product board strip may be a particle board strip, MDF fiber board strip or OSB fiber board strip.

According to a second embodiment of the process according to the invention, a method of producing endless laminated veneer boards comprises the steps of: applying an adhesive to at least some of a plurality of veneer panels; assembling the plurality of veneer panels in a plurality of interlinking layers to form one or more cover-layer strands, each of the cover-layer strands having central panels and outer panels; combining one or more of the plurality of cover-layer strands to form a veneer-panel strand, the veneer-panel strand having outer layers and central layers, wherein a moisture content of at least one of the adhesive and the veneer panels is lower at the central layers than at the outer layers; and preheating said veneer-panel strand from outside inwards.

Preferably, the central layers have a moisture content of about 6%, and the outer layers have a moisture content of about 7%.

According to a third embodiment of the invention, an apparatus for producing endless laminated veneer boards, comprises: at least one adhesive applicator for applying adhesive to veneer panels; at least one veneer-panel laying device for interlinking layers of said veneer panels to form a cover-layer strand; and a preliminary press with preheating device for preheating from inside outwards a veneer-panel strand comprising one or more of said cover-layer strands, said veneer-panel strand having outer layers and central layers, wherein a moisture content of at least one of the adhesive and the veneer panels is greater at the central layers than at the outer layers.

The apparatus may further comprise a controller for numerically controlling release or engagement of gluing rolls in the adhesive applicator during passage of the veneer panels.

BRIEF DESCRIPTION OF THE DRAWINGS

Further advantages and embodiments of the invention will become apparent from the following description with reference to the drawings, in which:

FIG. 4 shows two cover-layer strands with a central-layer strand comprising derived timber product boards being brought together.

DETAILED DESCRIPTION OF THE PREFERRED EMBODIMENTS

According to a first example of the invention, layers of glue applied to the veneer panels and/or the veneer panels for the center or for those of a central-layer strand themselves have a higher moisture content than the layers of glue and/or the veneer panels for the outer layers or the cover-layer strands. The veneer panels are each then assembled to give an upper and a lower cover-layer strand and, if required, a central-layer strand and combined to give a veneer-panel strand. Prior to entering the continuously operating press, the veneer-panel strand is passed through a preliminary press with a microwave or high-frequency preheating device, the heat input of which acts from the inside outwards.

According to a second example of the invention, layers of glue applied to the veneer panels and/or the veneer panels for the center or for those of a central-layer strand themselves have a lower moisture content than the layers of glue and/or the veneer panels for the outer layers or the cover-layer strands. The veneer panels are each then assembled to give an upper and a lower cover-layer strand and, if required, a central-layer strand and combined to give a veneer-panel strand. Prior to entering the continuously operating press, the veneer-panel strand is passed through a preliminary press with a preheating device, the heat input of which into the veneer-panel strand acts from the outside inwards.

An apparatus for carrying out the process comprises a glue application machine, roller conveyors, a veneer-panel laying device, a preliminary press with a preheating device, and a continuously operating press. Veneer-panel stacks with veneer panels of different moisture contents are arranged ahead of the veneer-panel gluing device, and dedicated glue application machines are provided for the veneer panels of the cover-layer strands and for the veneer panels of the central-layer strand. Dedicated veneer-panel laying devices are provided for each cover- and central-layer strand.

Figure 1:
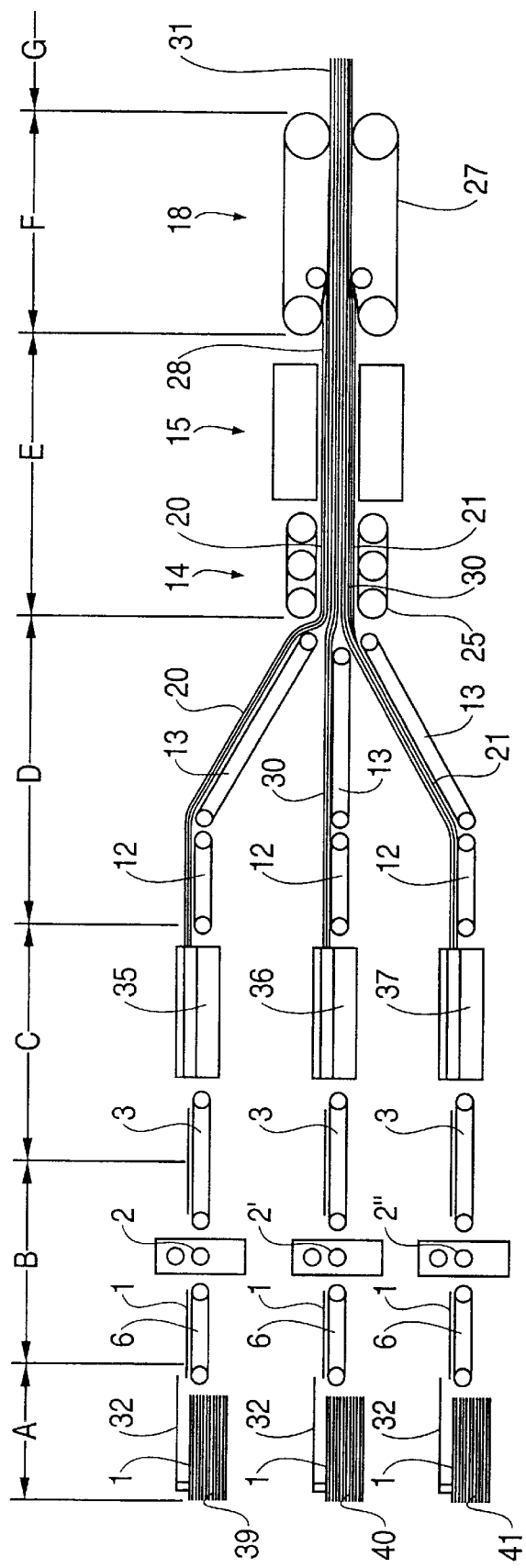
FIG. 1 shows the apparatus according to the invention in side view.

FIG. 1 shows an overall perspective view of an apparatus according to the invention. According to the division of the apparatus along its length as shown in FIG. 1, the sections have the following significance:

A Veneer panel stack with removal device;

B Veneer-panel glue applicator;

C Veneer-panel laying and interlinking unit;

D Veneer-assembly combining system;

E Preliminary press with preheating device;

F Continuously operating press; and

G Laminar veneer board (finishing).

Section A

Veneer panels 1 with different moisture contents are stored on the veneer-panel stacks 39, 40 and 41 and are fed onto feed belts 6 by means of removal devices 32. In this arrangement, the veneer-panel stacks 39 and 41 are provided for the upper and lower cover-layer strands 20 and 21, respectively, and veneer-panel stack 40 is provided for the central-layer strand 30. Depending on what kind of heating (e.g., microwave/high-frequency heating or convection/radiant heating) has been installed in the preliminary press with preheating device 15, the veneer panels 1 are stacked on the veneer-panel stacks 39 and 41 for the cover-layer strands 20 and 21 or on the veneer-panel stack 40 for the central-layer strand 30 with higher moisture contents.

Section B

Figure 3:
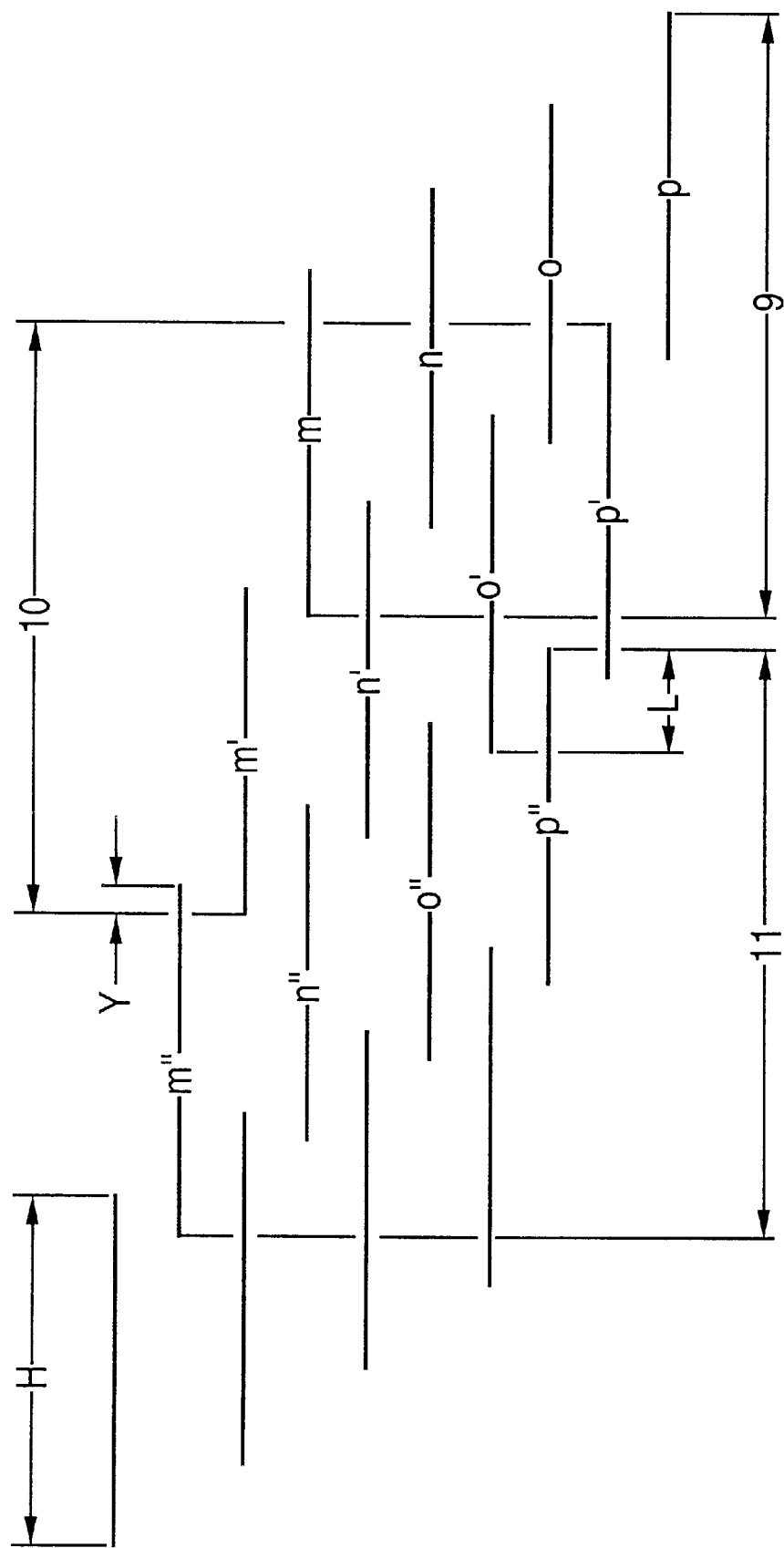
FIG. 3 shows the structure of the veneer assembly with a veneer panel length H, veneer panel projection L and veneer panel overlap Y.

The veneer-panels 1 comprising veneer sheets with thickness of, for example, from 1 mm to about 4.6 mm, and planar dimensions of, for example, 4'×8' or 3'×6' (about 0.8 m×2.4 m) run at high speed through the glue applicators 2, 2' and 2" from the veneer-panel stacks 39, 40 and 41 and are fed to the transfer belts 3. Only the top side of each veneer panel 1 is glued, allowing it to be transported easily through the whole of section B and up to and including section F on belts and roller tables. Only the top veneer panel m (as shown in FIG. 3) of each veneer assembly 9, 10 or 11 for the upper cover-layer strand 20 is not glued. Adhesion is in each case ensured by gluing the veneer panel n underneath. The layer structure of a strand is recorded numerically as it passes through sections A, B, C and D by counting the veneer panels 1 in an appropriate manner in the lead-up to the glue applicators 2, 2' and 2". Like the veneer panels 1 from the individual stacks 39, 40 and 41, the glue in the individual glue applicators 2, 2' and 2" is adjusted to give different moisture contents in accordance with the type of heating in the preliminary press with its preheating device 15. However, it is also possible for the moisture contents of the veneer panel 1 and of the glue layers to be applied to be adjusted so that, as the veneer panels 1 run through continuously, the individual glue applicators 2, 2' and 2" are engaged or released in terms of the application of the glue rolls to the surfaces of the veneer panels, this being done under numerical control such that the moisture content of the glue is matched to the moisture content of the veneer panels 1.

Section C

The way in which the veneer panels 1 are fed, assembled and combined in the veneer panel laying devices 35, 36 and 37 is disclosed in accordance with DE-A 196 27 024.

FIG. 3 shows the interlinked or interleaved structure of the veneer panels 1 to give a number of veneer assemblies 9, 10 and 11 and a cover-layer strand 20 or 21 or central-layer strand 30. The individual veneer panels 1 are bonded mechanically by the veneer overlap Y after interleaving to give the corresponding veneer panels m, n, o, p of a veneer assembly 9, 10 or 11. The constant operating speed and the identical geometric positions of the veneer panel length H, veneer panel projection L, and veneer panel overlap Y here result in the same veneer assembly configuration in every case, i.e. the fixing of the veneer panels 1 relative to one another in the strand of assemblies.

The veneer panels 1 in the veneer-panel laying devices 35, 36 and 37 are laid layer by layer in line with the direction of the wood fibers, in the direction of transport and in the same direction for each veneer-panel layer. Increased bending strength can be achieved if, when laying the individual veneer panels 1 one on top of the other, the direction of the fibers from one veneer panel 1 to the other or from layer to layer is different. In other words, the veneer panels 1 may be aligned before being laid one on top of the other and interleaved in the veneer-panel laying devices 35, 36 and 37, or, if required, fed in from the veneer-panel stacks 39, 40 and 41. Thus, for example all veneer panels 1 in one layer plane are laid with their wood fibers in the direction of transport, whereas all the veneer panels 1 in the layer plane below are laid with their wood fibers at 90° to the direction of transport.

Sections D and E

The continuously formed cover-layer strands 20 and 21 and the central-layer strand 30 are taken over by the run-on belts 12 and fed to the central transfer belt 25 by way of laying belts 13. As can be seen in FIG. 1, the preliminary press comprises an inlet roller frame 14 with integral preheating, which can be produced, for example, by a UHF or microwave field or convection/radiant heating.

Figure 2:
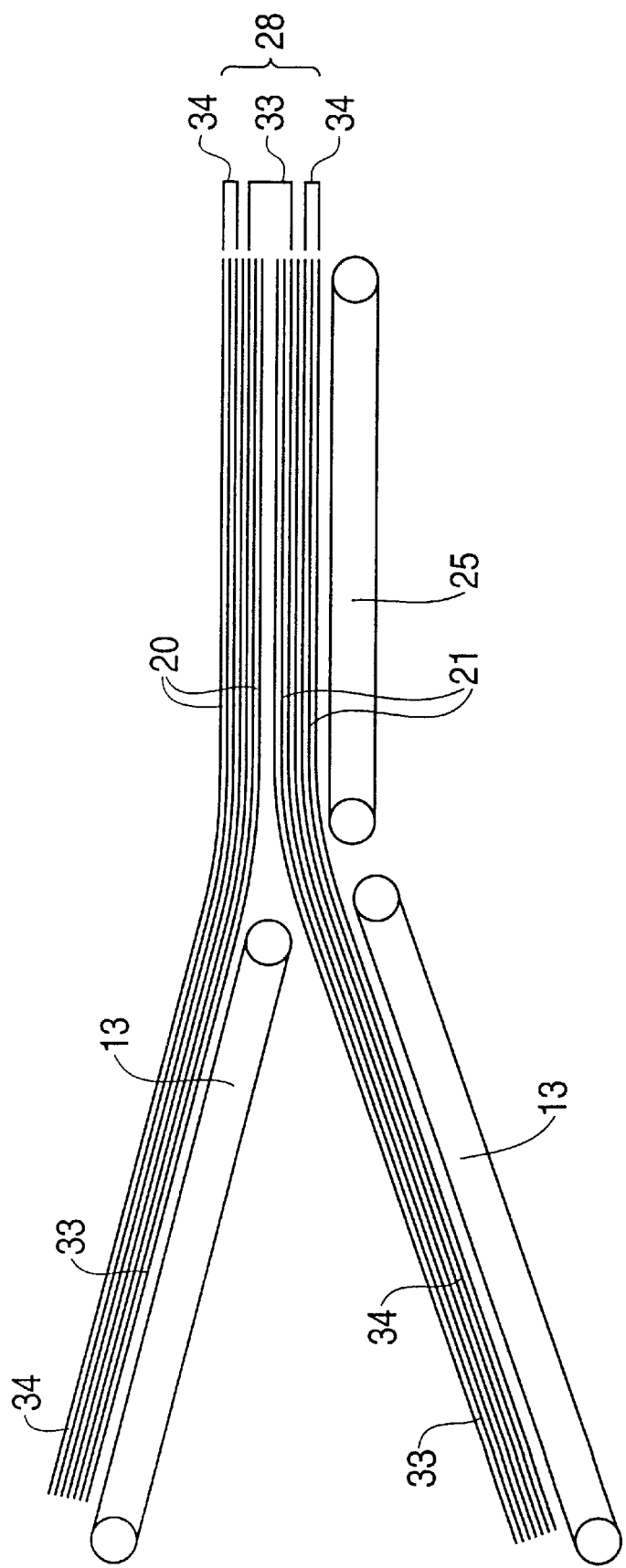
FIG. 2 shows two cover-layer strands of different moisture contents being brought together on an enlarged scale.

FIG. 2 shows in longitudinal section how, in the two-strand method, a double veneer-panel strand 28 comprising two cover-layer strands 20 and 21 is formed and fed by means of the central transfer belt 25 to the preliminary press 15.

The teachings and advantages of the present invention can also be applied analogously with a two-strand laying process involving a veneer-panel strand 28 formed from two cover-layer strands 20, 21 if the veneer panels 1 or layers of glue on the inside of the two cover-layer strands 20, 21 have different moisture settings and are preheated in accordance with the present invention. Thus, the cover-layer strands 20 and 21 may comprise veneer panels 1 and layers of glue of differing moisture content between the outer layers 34 and central layers 33.

As a guide for the moisture concentration when using a microwave or high-frequency heating (HF heating) in the preliminary press 15, providing heating of the veneer-panel strand from the inside outwards, a higher moisture setting in the center or central-layer strand of about 7.8% by weight for the veneer panels or layers of glue relative to a figure of about 6% by weight in the outer layers or cover-layer strands of the veneer panels or layers of glue is suggested.

More rapid setting of the glue joints and hence a higher production speed is likewise achieved if the higher moisture setting for the cover-layer strands relative to the veneer panels in the center or central-layer strand is provided in combination with heating of the veneer-panel strand from the outside inwards. Thus, when using convection or radiant heating acting from the outside inwards in the preliminary press, it is more advantageous to set the moisture content in the center or central-layer strand to about 6% by weight compared with a figure of about 7% by weight in the outer layers or cover-layer strands.

In both examples, the moisture contents of the veneer panels and layers of glue should be matched to one another.

When producing a three-ply-strand laminated veneer board with a central-layer strand consisting of veneer panels, it may sometimes be expedient to provide a board strand made of derived timber products, comprising particle boards, MDF fiber boards or OSB boards. FIG. 4 shows an advantageous and economical structure for the laminated veneer board 31, according to which the central-layer strand 30 has a particle, OSB or MDF board strip 38 joined together continuously at the ends and being combined with two cover-layer strands 20 and 21 to give a veneer-panel strand 28.

In this structure, there is no veneer-panel laying and interlinking station for the transfer of the central-layer strand. Instead, the central layer would simply be transferred in the form of boards made of derived timber products, each joined together at the end where they abut by means of either a groove or a bevel. The boards are provided with an additional glue joint and are cured in a hot press. The surfaces of these boards made of derived timber products are wetted with a layer of glue in a central-layer glue applicator provided for this purpose, giving rise to a joint between the veneer-panel cover layers and the central layer in the continuously operating hot press. Suitable boards made of derived timber products from the cost point of view are low-quality boards, e.g.:

a particle board of lower density of $\leqq 600$ Kg/m$^3$;

an MDF board of low density of $\leqq 500$ Kg/m$^3$; or an OSB board of low density of $\leqq 600$ Kg/m$^3$.

With this three-ply-board concept of sandwich construction, it is possible to achieve an economical sandwich structure with a high bending strength thanks to the outer veneer-panel strands. In this case, the central laying station can be used optionally on an interchangeable basis as a device for carrying out the process.

Section F

This section comprises a continuously operating press 18 used for gluing and compressing the veneer panel strand 28. The revolving steel belts 27 at the top and bottom are supported relative to the heated compression/heating plates by means of rolling rods, if required.

Section G

After leaving the continuously operating press 18, the emerging endless laminated veneer board 31 is fed to final finishing. For example, the endless laminated veneer board 31 may be divided into appropriate structural elements, beams and supporting elements for the construction of prefabricated houses.

An advantage of the present invention is that the higher moisture setting in the center or central-layer strand relative to the outer cover-layer strands results in a higher temperature due to the focussing in the center and the increased wave resistance and hence in more rapid setting of the glue joints, allowing a higher production speed to be achieved.

The foregoing description of the preferred embodiments of the invention has been presented for purposes of illustration and description. It is not intended to be exhaustive or to limit the invention to the precise form disclosed, and modifications and variations are possible in light of the above teachings or may be acquired from practice of the invention. The embodiment was chosen and described in order to explain the principles of the invention and its practical application to enable one skilled in the art to utilize the invention in various embodiments and with various modifications as are suited to the particular use contemplated. It is intended that the scope of the invention be defined by the claims appended hereto, and their equivalents.

The priority application here, German patent application No. 198 35 946.2, filed Aug. 8, 1998, is hereby incorporated by reference. Also, U.S. patent application Ser. No. 09/369,847, filed Aug. 9, 1999 and corresponding to German patent application No. 198 35 988.8, is hereby incorporated by reference.

I claim:

1. A method of producing endless laminated veneer boards comprising the steps of:

applying an adhesive to at least some of a plurality of veneer panels;

assembling said plurality of veneer panels in a plurality of interlinking layers to form one or more cover-layer strands, each of said cover-layer strands having central panels and outer panels;

combining one or more of said plurality of cover-layer strands to form a veneer-panel strand, said veneer-panel strand having outer layers and central layers, wherein a moisture content of at least one of the adhesive and the veneer panels is greater at the central layers than at the outer layers; and preheating said veneer-panel strand from inside outwards.

2. The method according to claim 1, wherein said central layers have a moisture content of about 7.8%, and said outer layers have a moisture content of about 6%.

3. The method according to claim 1, further comprising the step of pressing said veneer-panel strand in an operating press.

4. The method according to claim 1, wherein, during said step of assembling, direction of fibers in one of said plurality of layers of the veneer panels are placed at a 90° offset to an adjacent layer.

5. The method according to claim 1, wherein:

said step of combining includes combining two cover-layer strands, said central layers of said veneer-panel strand comprise the central panels of said two cover-layer strands and said outer layers of said veneer-panel strand comprise the outer panels of said two cover-layer strands, and a moisture content of at least one of the adhesive and the veneer panels is greater for the central panels than for the outer panels.

6. The method according to claim 5, wherein said step of combining includes combining a derived timber product board strip between said two cover-layer strands.

7. The method according to claim 5, wherein said step of combining includes combining a continuously joined particle board strip between said two cover-layer strands.

8. The method according to claim 7, wherein said particle board strip has a density less than 600 Kg/m$^3$.

9. The method according to claim 5, wherein said step of combining includes combining a continuously joined MDF fiber board strip between said two cover-layer strands.

10. The method according to claim 9, wherein said MDF board strip has a density less than 500 Kg/m$^3$.

11. The method according to claim 5, wherein said step of combining includes combining a continuously joined OSB fiber board strip between said two cover-layer strands.

12. The method according to claim 11, wherein said OSB board strip has a density less than 600 Kg/m$^3$.

13. The method according to claim 1, wherein:

said step of combining includes combining two cover-layer strands and at least one central-layer strand, a moisture content of the adhesive being uniform within each cover-layer and central-layer strand and a moisture content of the veneer panels being uniform within each cover-layer and central-layer strand, and a moisture content of at least one of the adhesive and the veneer panels is greater in the central-layer strand than in the cover-layer strands.

14. The method according to claim 1, wherein:

said step of applying includes adjusting the moisture content of the adhesive to the moisture content of the veneer panels.

15. The method according to claim 1, wherein:

said step of preheating includes preheating said veneer-panel strand in a preliminary press with a microwave or high-frequency preheating device.

16. The method according to claim 15, further comprising the step of pressing said veneer-panel strand in an operating press.

* * * * *